(12) United States Patent
Gui et al.

(10) Patent No.: US 7,991,765 B2
(45) Date of Patent: Aug. 2, 2011

(54) COST-BASED QUERY REWRITE USING MATERIALIZED VIEWS

(75) Inventors: Hong Gui, Middleton, WI (US); Grace Au, Rancho Palos Verdes, CA (US); Kuorong Chiang, Cerritos, CA (US)

(73) Assignee: Teradata US, Inc., Dayton, OH (US)

( * ) Notice: Subject to any disclaimer, the term of this patent is extended or adjusted under 35 U.S.C. 154(b) by 411 days.

(21) Appl. No.: 12/183,571

(22) Filed: Jul. 31, 2008

(65) Prior Publication Data

US 2010/0030731 A1 Feb. 4, 2010

(51) Int. Cl.
*G06F 7/00* (2006.01)
(52) U.S. Cl. .......................... 707/713; 707/714
(58) Field of Classification Search .................. 707/713, 707/714, 715, 717, 718, 719, 999.002
See application file for complete search history.

(56) References Cited

U.S. PATENT DOCUMENTS

| | | | |
|---|---|---|---|
| 6,505,188 B1 | 1/2003 | Ghazal et al. | |
| 6,505,189 B1 | 1/2003 | On Au et al. | |
| 6,618,720 B1 | 9/2003 | On Au et al. | |
| 6,643,636 B1 | 11/2003 | Au et al. | |
| 6,732,096 B1 | 5/2004 | Au | |
| 7,676,450 B2 * | 3/2010 | Ahmed et al. | 707/999.002 |
| 7,702,627 B2 * | 4/2010 | Ahmed et al. | 707/999.005 |
| 7,809,713 B2 * | 10/2010 | Su et al. | 707/713 |
| 2007/0219951 A1 * | 9/2007 | Ahmed et al. | 707/2 |
| 2008/0033914 A1 * | 2/2008 | Cherniack et al. | 707/3 |

* cited by examiner

*Primary Examiner* — Hung T Vy
(74) *Attorney, Agent, or Firm* — Schwegman, Lundberg & Woessner

(57) ABSTRACT

A system and method of rewriting a database query where the query contains an aggregate includes the following. If one or more aggregate materialized views are considered, rewriting the query using an aggregate materialized view. If one or more non-aggregate multi-table materialized views are considered, the query is rewritten using a multi-table materialized view. A join cost is determined for each such non-aggregate multi-table materialized view. If one or more non-aggregate single table materialized views are considered, the query is rewritten using the single table materialized view. A join cost is determined for each such non-aggregate single table materialized view. Finally, a current total cost is determined for use of various materialized views as a function of join cost, aggregation cost and spool cost to select a rewritten query.

20 Claims, 3 Drawing Sheets

COST-BASED QUERY REWRITE USING MATERIALIZED VIEWS

BACKGROUND

A materialized view (MV) is a query result stored in tabular format in a relational database management system (RDBMS). It is used to pre-calculate joins and/or aggregates so that the results can be fetched directly to answer a query when applicable instead of calculating from the base table. It can significantly improve the query performance in a large decision support system (DSS).

Materialized views may be used in a query plan through query rewrite which is transparent to users. A query optimizer determines whether one or more MVs will be used to answer a query by replacing the corresponding base table(s). In this process, the optimizer first evaluates if a MV is applicable, such as if it has all the columns selected in the query, if it contains a superset of rows requested by the query, etc. Then the optimizer decides whether an applicable MV is actually used based on certain criteria. When there are multiple MVs, the number of ways to rewrite a query with different combinations of MVs can be large. The choice of MVs is partially rule-based due to the complexity of the search space. The situation becomes worse when there are aggregates in the MV definition, which may be referred to as an aggregate MV (AMV). In some cases the choice of AMVs is completely rule-based, which may result in suboptimal plans in query rewrite.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

As On Line Analysis Processing (OLAP) plays more and more important roles in DSS, users rely more on aggregate materialized views (AMVs) in relational database management systems (RDBMS) to get the fast response time of queries that they can get in a multidimensional OLAP (MO-LAP) system. But if the optimizer can't choose the right AMV, it can't achieve the desirable performance. In various embodiments of the present invention, a cost-based query rewrite utilizes MVs that may not always contain aggregate materialized views. The search space may be trimmed according to the types of the MVs and the choice of MVs to optimize query performance based on the total cost of joins, aggregates and the final retrieval.

Figure 1:
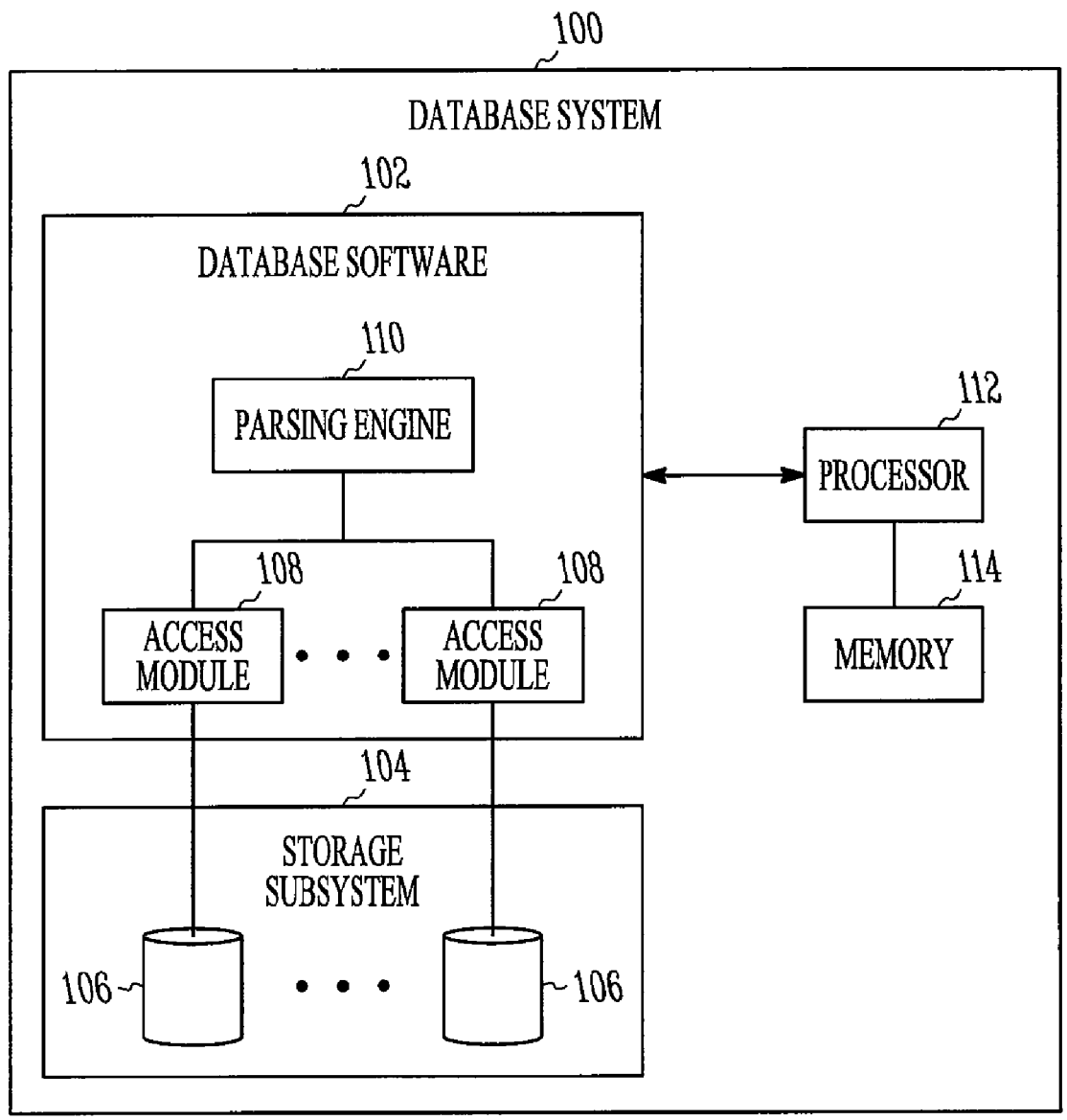
FIG. 1 is a block diagram of a database system which has query optimization including query rewrite according to an example embodiment.

An example relational database system is shown at 100 in FIG. 1. A processor 112 is coupled to a memory 114, from which computer executable code may be executed by the processors 112. In one embodiment, database software 102 is included in relational database system 100, as is a storage subsystem 104 having one or more storage devices indicated at 106, which may include disk drives, optical storage, tape storage or other storage. Database software may include one more access modules 108 that are coupled to the storage devices 106 for accessing data in the storage devices 106. A parsing engine 110 receives requests for data, such as structured query language queries, and directs the access modules to retrieve the data.

In further embodiments, multiple input/output (I/O) systems, such as communication devices, displays, keyboards, cursor control devices, sound, etc. may be provided. Processor 112 runs database software 102 and interacts with storage subsystem 104, which may be integral to the database system 100, or remotely accessed via a network. Storage devices 106 store data in a relational form of rows and columns. In one embodiment, the relational database software 102 includes query optimization software that logically organizes the data such that queries of the data are executed more efficiently and quickly. In various embodiments, storage subsystem 104 may be an array of disk drives, either local or remote from the computer system 110. Other storage devices may also be used in different embodiments. Relational database system 100 may also include multiple processors, computer systems and mass storage devices in further embodiments, either in a single location or distributed and coupled via network.

In one embodiment, a cost-based MV rewrite algorithm uses a heuristic based on the types of MV to trim the search space and chooses the plan according to the total cost of joins, aggregates and the final retrieval. The heuristic allows the optimizer to find a cost efficient plan using multiple MVs in a complex search space without consuming too many resources.

With the development of MV techniques, users can define various kinds of MVs in their RDBMS, such as:
1. Single table MV (SMV)—MV defined on a single table, usually with a different primary index to change the distribution of the data rows to lower the cost of joins;
2. Multiple table MV (MMV)—MV defined on multiple tables with a precalculated join result among base tables;
3. Aggregate MV (AMV)—SMV or MMV with aggregate results. It can be a traditional AMV which contains the aggregate result at a single level, or an AMV that has been developed in some RDBMS which contains multiple levels of aggregates represented by GROUPING SET, ROLLUP, or CUBE;

4. Sparse MV—MV with single table predicates in the WHERE clause which changes the cardinality of the MV based on the selectivity of the predicate.

Figure 2:
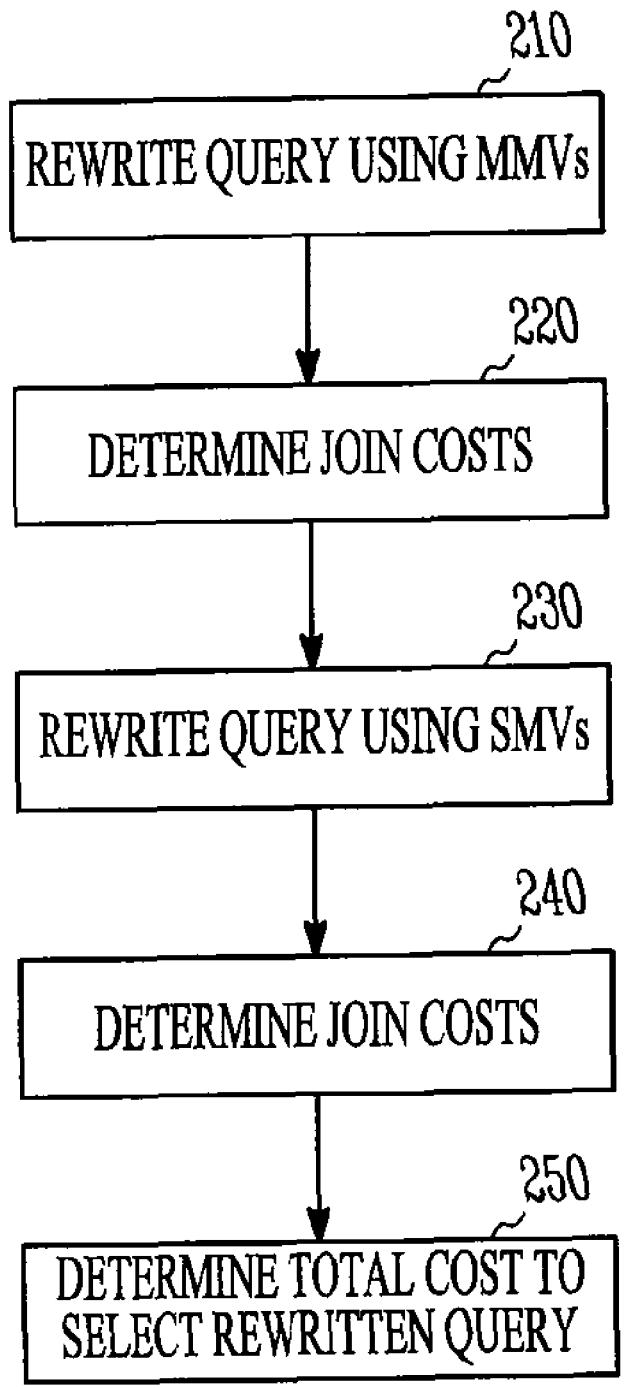
FIG. 2 is a flowchart illustrating a method of rewriting queries that include aggregation according to an example embodiment.

A method 200 of rewriting a database query where the query contains an aggregate is illustrated in a flow chart in FIG. 2. In one embodiment, if one or more aggregate materialized views are considered, rewriting the query using the aggregate materialized view. At 210, if one or more non-aggregate multi-table materialized views are considered, the query is rewritten using a multi-table materialized view. A join cost is determined at 220 for each such non-aggregate multi-table materialized view. At 230, if one or more non-aggregate single table materialized views are considered, the query is rewritten using the single table materialized view and at 240, a join cost is determined for each such non-aggregate single table materialized view. At 250, a current total cost is determined for use of various materialized views as a function of join cost, aggregation cost and final spool cost to select a rewritten query.

The query rewrite may take various factors that affect the total cost of executing the query into consideration. Some heuristics that have been used before a certain type of MVs was developed may no longer be applicable. For instance, one of the rules used in some RDBMS is that an AMV is always chosen before any other MVs are considered. The assumption is that aggregates are expensive operations so using an AMV will always lower the cost. This may not be true when sparse MVs come into the play whose selectivity may dramatically reduce the number of rows upon which the aggregate is calculated. The following is a simple example that illustrates this point:

EXAMPLE #1

Query:
Sel x1, y2, z3, sum (y1)
From t1, t2, t3
Where x1=x2 and y2=y3 and y2=100
Group by x1, y2, z3;
MMV:
Sel x1, y1, y2, z3
From t1, t2, t3
Where x1=x2 and y2=y3 and y2=100;
AMV:
Sel x1, y2, z3, sum (y1)
From t1, t2, t3
Where x1=x2 and y2=y3
Group by x1, y2, z3;

Suppose that the join result of the 3 tables has 100 million rows, the grouping keys have 1 million distinct values, and the single table predicate y2=100 is highly selective which selects 1000 rows. The costs of using the MMV and AMV are sum (1000 rows)+scan (<=1000 rows) and scan (1 M rows) respectively. So even with an AMV with the exact matching grouping keys, the benefit of using the pre-calculated aggregate result may not outweigh the benefit of using a very sparse MMV with many fewer rows to process.

Once AMVs are not given higher priority over other kinds of MVs, the cost on which the query rewrite is based in one embodiment on the join and aggregate cost if there are such operation left to do after replacing the base tables with the MVs. For example,

EXAMPLE #2

Query:
Sel x1, y2, sum(z1)
From t1, t2, t3
Where x1=x2 and y2=y3 and y2=100
Group by x1, y2;
AMV1:
Sel a1, x1, y2, sum (z1)
From t1, t2
Where x1=x2 and y2>10
Group by a1, x1, y2;
SMV:
Sel y3, z3
From t3;
AMV2:
Sel b1, x1, y2, sum (z1)
From t1, t2, t3
Where x1=x2 and y2=y3
Group by b1, x1, y2;

Suppose the cardinalities of the above three MVs are 1000, 1000, and 1 M respectively. The query rewrite process will compare:
Plan A: sum(AMV1 joins with SMV)
Vs.
Plan B: sum(AMV2)

In case that the cost of AMV1 joining SMV is low and the cardinality of the join result is much smaller than that of AMV2, the total cost of join and aggregation in plan A is lower than that of the aggregate cost in plan B so that the combination of AMV1 and SMV should be chosen instead of AMV2 although it covers all three tables in the query.

In the context of query rewrite using MVs, the total cost is composed of three parts in one embodiment:

$$TotalCost=JoinCost+AggrCost+ResultSpoolCost$$

The JoinCost may be defined as the cost of joins among tables, which may include redistribution, scan, sort, join etc. The AggrCost may be defined as the cost of performing the aggregate operation upon the join result, which includes the read cost of the source and the cost of the sum step. The ResultSpoolCost may be defined as the cost of the retrieve step which generates the final result spool. For cases where the SUM step is needed in the plan, this step will be the retrieve from the SUM result with the HAVING clause condition applied if there is one. For the special case where an AMV with the same level of aggregate is used, there is no SUM step in the plan. ResultSpoolCost will be the cost of the retrieve step from the AMV table where the WHERE and HAVING clause conditions are applied.

It's assumed that there are existing modules to calculate the join and aggregate costs in a RDDMS optimizer. The query rewrite algorithm will calculate the total cost based on these components. In various embodiments, either JoinCost or AggrCost can be zero in a particular plan. If after the query rewrite, there is only one table left in the query and there is no other operation necessary prior to the final aggregation, JoinCost will be zero. On the other hand, if the AMV used is at the same aggregate level as that in the query, no further aggregate is needed so AggrCost will be zero.

Partial Group By (PGB) is accommodated in some embodiments, which is another optimization used in a RDBMS. PGB means that some level of aggregation is done prior to the joins when it is found more cost efficient. It may be assumed that the PGB cost model adds the sum cost to the preparation cost of the join relations, which is in turn included in the binary join cost involving the partially aggregated relation. So the join cost part of the total cost will reflect the PGB cost change if it's applied either to the MVs or base tables in the query.

The search space for the MV selection problem in some embodiments consists of all possible ways to rewrite the query with different combinations of MVs defined in the system. It may not be desirable to spend too much resource exploring the entire space to find "the" most efficient rewrite. In one embodiment, a goal is to find a plan that will give a good performance with a reasonable search effort based on cost.

Assuming that there are N MVs, among which there are $N_1$ AMVs, $(N-N_1)$ non aggregate MVs, among which there are $N_2$ MMVs and $N_3$ SMVs. Therefore $N=N_1+N_2+N_3$. We trim the search space by the heuristic that at most one AMV, one non-aggregate MMV and up to $L_1$ non-aggregate SMVs will be used in a plan.

The use of this heuristic may be based on the following observations. Because of the maintenance cost of MVs, it may be favorable to have fewer MVs defined and to use them to answer as many queries as possible. Some of the new technologies developed in the MV area are to support this idea:

In a further embodiment, a broad MV exploits the foreign key primary key relationship between tables to allow extra joins in the MV so that one MV can be used to answer queries on different subsets of tables. In yet a further embodiment, AMV with extended grouping it allows the extended grouping, such as GROUPING SET, ROLLUP, CUBE, in the AMV definition so that multiple levels of aggregates can be stored in one AMV. One advantage of this type of AMVs is that users don't need to create multiple AMVs to satisfy queries at different aggregate levels. Various optimizations can be exploited for building and maintaining such AMVs.

Based on these considerations, the query rewrite will trim the search space for those combinations of multiple AMVs and multiple non-aggregate MMVs. While it is possible that the query rewrite may miss the optimum plan, the possibility in the context of real world applications is not believed significant.

In some embodiments, SMVs may be good for redistributing the data in base tables, adding a filter to get the exact portion of data out of the base tables, repartitioning the base table to get more efficient join plans etc. The query rewrite allows the selection of multiple SMVs combined with the AMV and MMV. The maximum number of SMV allowed in a plan ($L_1$) is adjustable according to the resources availability.

Figure 3:
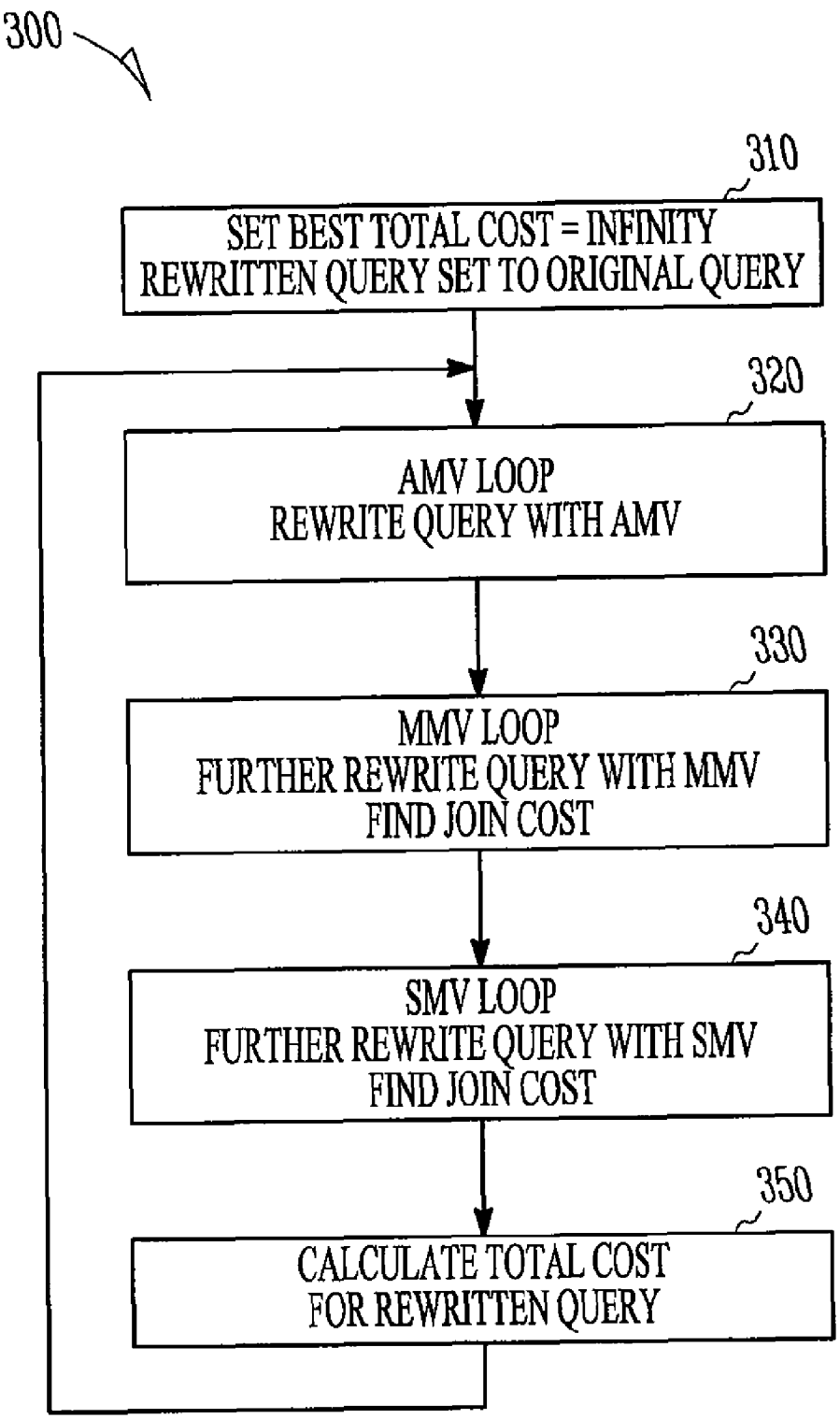
FIG. 3 is a flowchart illustrating a method of rewriting queries that include aggregation according to an example embodiment.

The following is a sketch of the query rewrite according to an example embodiment, and is illustrated generally at 300 in flowchart form in FIG. 3:

---

At 310,
BestTotalCost = INFINITY;
TheRewrittenQuery is set to be the original query;
At 320,
For (i=1; i<= $N_1$ + 1; i++) (AMV Loop: including the case with no AMV)
{
   If (an AMV is considered)
     Rewrite the query with the AMV;
At 330,
   For (j=1; j<= $N_2$ + 1; j++) (MMV Loop: including the case with no non-aggregate MMV)
   {
     If (a non-aggregate MMV is considered)
       Further rewrite the query with the MMV;
     TempRewrittenQuery is set to be the rewritten query so far;
     TempBestJoinCost = join cost of the TempRewrittenQuery;
     NoOfSMVUsed = 0;
At 340,
     For (k=1; k<= $N_3$ + 1; k++) (SMV Loop: including the case with no non-aggregate SMV)
     {
       If (a non-aggregate SMV is considered)
          Further rewrite the TempRewrittenQuery with the SMV;
       CurrentJoinCost = join cost of the current rewritten query;
       If (CurrentJoinCost < TempBestJoinCost)
       {
          NoOfSMVUsed ++;
          If (NoOfSMVUsed > $L_1$)
             Break;
          TempBestJoinCost = CurrentJoinCost;
          Save the current rewritten query as a TempRewrittenQuery;
       }
     } /* SMV Loop: up to $L_1$ SMVs can be used in TempRewrittenQuery after this loop */
     If (there is aggregate left to do in TempRewrittenQuery)
       Calculate AggrCost;
     Else
       AggrCost = 0;
At 350,
     CurrentTotalCost = TempBestJoinCost + AggrCost + ResultSpoolCost;
     If (CurrentTotalCost < BestTotalCost)
     {
       BestTotalCost = CurrentTotalCost;
       Save the TempRewrittenQuery as a TheRewritten Query;
     }
     Undo the non-aggregate MMV and SMV part of rewrite if needed;
   } /* MMV Loop */
   Undo the AMV part of rewrite if needed;
} /* AMV Loop */

---

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of rewriting a database query where the query contains an aggregate, the method comprising:
    if one or more aggregate materialized views are considered, rewriting the query using an aggregate materialized view;
    if one or more non-aggregate multi-table materialized views are considered, rewriting the query using a multi-table materialized view and determining a join cost for each such non-aggregate multi-table materialized view;
    if one or more non-aggregate single table materialized views are considered, rewriting the query using the single table materialized view and determining a join cost for each such non-aggregate single table materialized view; and
    determining a current total cost for using various materialized views as a function of join cost, aggregation cost and final spool cost to select a rewritten query.

2. The method of claim 1 and further comprising trimming a search space having multiple aggregate materialized views and multiple non-aggregate multi-table materialized view.

3. The method of claim 2 wherein trimming the search space comprises limiting the number of each type of materialized views which may be considered for rewriting the query.

4. The method of claim 3 wherein the number of aggregate materialized views in the trimmed search space is 1.

5. The method of claim 3 wherein trimming the search space further comprises limiting the number of non-aggregate materialized views to a selected number greater than one.

6. The method of claim 1 and further comprising considering the cost of an aggregate materialized view to rewrite the query.

7. The method of claim 1 wherein join cost includes redistribution, scan, sort and join.

8. The method of claim 1 wherein aggregation cost is the cost of performing an aggregate operation upon a join result, and includes cost of a source and a sum step.

9. The method of claim 1 wherein the spool cost includes a cost of a retrieve step to generate a final result spool.

10. A non-transitory computer readable medium having instructions stored thereon for causing a computer to execute a method of rewriting a database query where the query contains an aggregate, the method comprising:
   if one or more aggregate materialized views are considered, rewrite the query using the aggregate materialized view;
   if one or more non-aggregate multi-table materialized views are considered, rewriting the query using a multi-table materialized view and determining a join cost for each such non-aggregate multi-table materialized view;
   if one or more non-aggregate single table materialized views are considered, rewriting the query using the single table materialized view and determining a join cost for each such non-aggregate single table materialized view; and
   determining a current total cost for using various materialized views as a function of join cost, aggregation cost and spool cost to select a rewritten query.

11. The non-transitory computer readable medium of claim 10 wherein the consideration of single table materialized views is nested within the consideration of multi-table materialized views, which is nested within the consideration of aggregate materialized views.

12. The non-transitory computer readable medium of claim 10 and further comprising trimming a search space having multiple aggregate materialized views and multiple non-aggregate multi-table materialized view.

13. The non-transitory computer readable medium of claim 12 wherein trimming the search space comprises limiting the number of each type of materialized views which may be considered for rewriting the query.

14. The non-transitory computer readable medium of claim 13 wherein the number of aggregate materialized views in the trimmed search space is 1.

15. The non-transitory computer readable medium of claim 13 wherein trimming the search space further comprises limiting the number of non-aggregate materialized views to a selected number greater than one.

16. The non-transitory computer readable medium of claim 10 and further comprising considering the cost of an aggregate materialized view to rewrite the query.

17. The non-transitory computer readable medium of claim 10 wherein join cost includes redistribution, scan, sort and join, and wherein the spool cost includes a cost of a retrieve step to generate a final result spool.

18. The non-transitory computer readable medium of claim 10 wherein aggregation cost is the cost of performing an aggregate operation upon a join result, and includes cost of a source and a sum step.

19. A database management system comprising:
   a processor;
   a storage system coupled to the processor;
   a parsing engine for executing on the processor wherein the parsing engine is configured to:
      if one or more aggregate materialized views are considered, rewrite the query using the aggregate materialized view;
      if one or more non-aggregate multi-table materialized views are considered, rewrite the query using a multi-table materialized view and determine a join cost for each such non-aggregate multi-table materialized view;
      if one or more non-aggregate single table materialized views are considered, rewrite the query using the single table materialized view and determine a join cost for each such non-aggregate single table materialized view; and
      determine a current total cost for using various materialized views as a function of join cost, aggregation cost and spool cost to select a rewritten query.

20. The system of claim 19 wherein the consideration of single table materialized views is nested within the consideration of multi-table materialized views, which is nested within the consideration of aggregate materialized views.

* * * * *